US012007872B2

(12) United States Patent
Koya et al.

(10) Patent No.: US 12,007,872 B2
(45) Date of Patent: Jun. 11, 2024

(54) DEBUGGING ASSISTANCE SYSTEM AND DEBUGGING ASSISTANCE METHOD

(71) Applicant: Nippon Telegraph and Telephone Corporation, Tokyo (JP)

(72) Inventors: Hidetaka Koya, Musashino (JP); Hajime Nakajima, Musashino (JP); Takeshi Masuda, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 164 days.

(21) Appl. No.: 17/427,166

(22) PCT Filed: Jan. 17, 2020

(86) PCT No.: PCT/JP2020/001538
§ 371 (c)(1),
(2) Date: Jul. 30, 2021

(87) PCT Pub. No.: WO2020/158460
PCT Pub. Date: Aug. 6, 2020

(65) Prior Publication Data
US 2022/0100637 A1    Mar. 31, 2022

(30) Foreign Application Priority Data
Jan. 31, 2019  (JP) ................................ 2019-016184

(51) Int. Cl.
*G06F 11/36*    (2006.01)
(52) U.S. Cl.
CPC .......... *G06F 11/3624* (2013.01); *G06F 11/36* (2013.01)
(58) Field of Classification Search
CPC .................................. G06F 11/3624
USPC ......................................................... 717/135
See application file for complete search history.

(56) References Cited

U.S. PATENT DOCUMENTS

| 2007/0168984 A1* | 7/2007 | Heishi et al. ........ | G06F 11/3624 717/124 |
| 2010/0325615 A1* | 12/2010 | Ramot ................ | G06F 11/3672 717/124 |
| 2012/0110384 A1* | 5/2012 | Brunet et al. ....... | G06F 11/3624 714/37 |

(Continued)

FOREIGN PATENT DOCUMENTS

| JP | 2017084402 | 5/2017 |
| JP | 2018045619 | 3/2018 |

OTHER PUBLICATIONS

Egi et al., "Development and Evaluation of Debugging Support System of Guide Tracing for Beginners," Journal of the Japan Society for Educational Technology, 2009, 32(4):369-381, 27 pages (With English Translation).

(Continued)

*Primary Examiner* — Wei Y Zhen
*Assistant Examiner* — Mohammed N Huda
(74) *Attorney, Agent, or Firm* — Fish & Richardson P.C.

(57) ABSTRACT

A debug information abstraction unit (32) of a proxy server (30) adds, when a predetermined rule of an extension program is embodied into a program, a program for outputting debug information regarding the predetermined rule to the embodied program. Then, a debug information transmission unit (41b) of a terminal device (40) transmits, to a debug support device (10), the debug information regarding the predetermined rule for which the program has been added.

5 Claims, 15 Drawing Sheets

(56) References Cited

U.S. PATENT DOCUMENTS

2013/0159975 A1\* 6/2013 Hu et al. ............... G06F 11/368
717/124
2018/0081779 A1 3/2018 Hiyama et al.

OTHER PUBLICATIONS

Hirai et al., "Debugging of Distributed Control Systems: Checking an Event History with Requirements Specifications," Information Processing Society of Japan Journal, 1992, 33(4):491-500, 21 pages (With English Translation).
Nishikawa et al., "A Method for Attaching Additional Functionalities onto Web-based OSS User Interfaces, " IEICE Technical Report, 2016, 116(124), 13 pages (With English Translation).
Shukuchi, "Debug Technique of Embedded System," Information Processing, 1997, 38(10):886-891, 13 pages (With English Translation).

\* cited by examiner

DEBUGGING ASSISTANCE SYSTEM AND DEBUGGING ASSISTANCE METHOD

CROSS-REFERENCE TO RELATED APPLICATIONS

This application is a National Stage application under 35 U.S.C. § 371 of International Application No. PCT/JP2020/001538, having an International Filing Date of Jan. 17, 2020, which claims priority to Japanese Application Serial No. 2019-016184, filed on Jan. 31, 2019. The disclosure of the prior application is considered part of the disclosure of this application, and is incorporated in its entirety into this application.

TECHNICAL FIELD

The present invention relates to a debug support system and a debug support method.

BACKGROUND ART

UI (User Interface) extension, which is a method for improving the convenience of web systems and realizing a reduction in operational errors, is a technique in which function extensions such as input check and automation of a web page are added without modifying the system, thereby improving the productivity of an operator. Typically, when a function is added to a UI of a web system, a HTML or source code of the system in a programming language is directly changed, whereas in the case of UI extension, instead of making a change in a programming language, mainly an abstract rule is generated and the generated rule is converted into a program code by a UI extension mechanism (hereinafter, referred to as "extension program"), thereby realizing addition of the function.

Also, debugging, which is to remove a bug from a program, is a big part of software development process, and also in the case of UI extension, it is difficult to generate a rule without a bug in a single rule generation, and thus a debug operation is required.

CITATION LIST

Non Patent Literature

[NPL 1] Tsuruko EGI and Akira TAKEUCHI "Development and evaluation of debugging support system of guide tracing for beginners", Japan Journal of Educational Technology, vol. 32, No. 4, pp. 369-381, 2009

[NPL 2] Kenji HIRAI, Akira SUGIMOTO, and Shigeru ABE, "Debugging of Distributed control System: Checking the Event History using Behavior Specification", Journal of Information Processing Society of Japan, vol. 33, No. 4, pp. 491-500, April 1992

[NPL 3] Masahiro Shukuguchi, "Debug Technique of Embedded System", Magazine of Information Processing Society of Japan, vol. 38, No. 10, October 1997

[NPL 4] Kenichi NISHIKAWA, Takeshi MASUDA, Hiroyuki ADACHI, Kimio TSUCHIKAWA, Akira INOUE, and Tsutomu MARUYAMA, "A Method for Attaching Additional Functionalities onto Web-based OSS User Interfaces", IEICE technical report, 2016

SUMMARY OF THE INVENTION

Technical Problem

However, conventional methods have the problems that efficient debugging is difficult, and improvements in efficiency and quality of rule generation may be impossible. For example, conventional debugging must be executed in a state in which a rule is embodied (in, e.g., a programming language such as JavaScript (registered trademark)), and there is a large gap in required knowledge and information between when the rule is generated and when debugging is performed. Thus, it is difficult for a rule generator to efficiently perform debugging.

Means for Solving the Problem

To solve the aforementioned problems and achieve the object, the debug support system according to the present invention includes: an abstraction unit configured to, when a predetermined rule of an extension program is embodied into a program, add a program for outputting debug information regarding the predetermined rule to the embodied program; and a transmission unit configured to transmit, to the outside, the debug information regarding the predetermined rule for which the program has been added by the abstraction unit.

Also, the debug support method according to the present invention relates to a debug support method that is executed by the debug support system, including: an abstraction step of, when a predetermined rule of an extension program to be added to an existing application is embodied into a program, adding a program for outputting debug information regarding the predetermined rule to the embodied program; and a transmission step of transmitting, to the outside, the debug information regarding the predetermined rule for which the program has been added in the abstraction step.

Effects of the Invention

With the present invention, effects are obtained such that efficient debugging is possible and improvements in efficiency and quality of rule generation can be achieved.

DESCRIPTION OF EMBODIMENTS

Hereinafter, embodiments of the debug support system and the debug support method according to the present application will be described in detail with reference to the drawings. Note that the debug support system and the debug support method according to the present application are in no way limited by the embodiments. Also, in the present application, a "rule" refers to a state of a program such as JavaScript that is abstracted so as to be easily read or generated by a user who does not have knowledge about programming and the like. As the abstraction method, any method can be used such as a method of abstracting a program as a combination of blocks so that a rule is expressed, and a method of abstracting a program as a flowchart so that a rule is expressed. In addition, expanding a rule into a program is referred to as "embodying". Also, a setting item refers to a unit of setting of a rule. For example, when a rule is expressed with a combination of blocks, one block is a setting item.

First Embodiment

In the following, a configuration of a debug support system 100 according to a first embodiment and a flow of processing performed by the debug support system 100 will be described in order, and then the effects of the first embodiment will be described.

Configuration of Debug Support System

Figure 1:
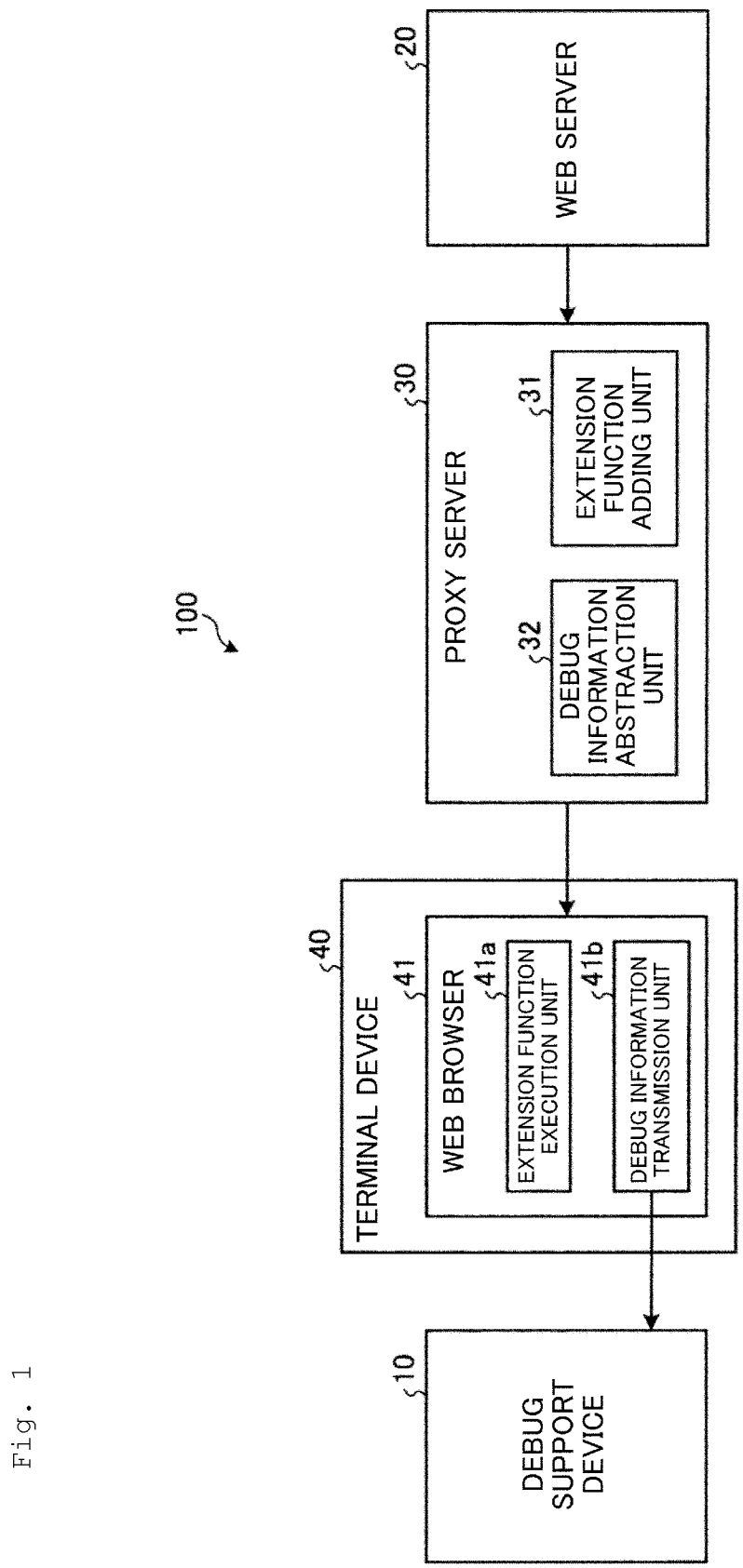
FIG. 1 is a block diagram illustrating an example of a configuration of a debug support system according to a first embodiment.

First, an example of a configuration of the debug support system 100 of the first embodiment will be described with reference to FIG. 1. FIG. 1 is a block diagram illustrating an example of a configuration of the debug support system according to the first embodiment. As shown in FIG. 1, the debug support system 100 includes, for example, a debug support device 10, a web server 20, a proxy server 30, and a terminal device 40.

The debug support device 10 outputs only debug information on a UI extension that is abstracted to the same granularity as that of a rule of the UI extension. Also, the debug support device 10 generates a test page obtained by simulating a web page to be debugged, applies the rule of the UI extension to this test, and displays the test page 13a to which the rule was applied on a web browser 13.

In response to a download request from the terminal device 40, the Web server 20 transmits data on the web page to the terminal device 40 via the proxy server 30. The proxy server 30 relays the data on the web page received from the web server 20 to the terminal device 40. Also, the proxy server 30 inserts a rule of a UI extension to be applied to the web page received from the web server 20, or inserts a program for outputting debug information.

The proxy server 30 includes an extension function adding unit 31 and a debug information abstraction unit 32. The extension function adding unit 31 inserts, into a text of the web page downloaded from the web server 20, the rule of the extension function to be applied to this page, the rule being embodied in JavaScript. Here, as the method of inserting the rule of the extension function, any method can be used such as, for example, a method of inserting the rule in the course of the proxy server downloading this text to the terminal device, a method of inserting the rule by a web browser using a browser add-on, or a method of inserting the rule from another application of the terminal device 40 using a function such as MSHTML. In the present embodiment, a description is given taking a case where a web system is an application target, but a configuration is also possible in which a local application running on the terminal device is used as an application target, and in this case, it is sufficient to use a well-known insertion means appropriate for the implementation of the application (in the case of a Java application, Bytecode Injection or the like is known).

When a predetermined rule of an extension program to be added to an existing application is embodied into a program, the debug information abstraction unit 32 adds a program for outputting debug information regarding the predetermined rule to the embodied program. For example, the debug information abstraction unit 32 adds, to JavaScript into which the rule inserted by the extension function adding unit 31 was embodied, JavaScript that outputs the debug information at the same level of abstraction as that of the rule.

For example, when a setting item of a predetermined rule of an extension program is embodied into a program, the debug information abstraction unit 32 adds a program for outputting, as debug information, at least information indicating the start and end of reflection of the setting item, parameter information input for the setting item, exception information indicating a case where reflection of the setting item is failed, and an identifier that uniquely specifies the setting item to the embodied program.

The terminal device 40 receives the data on the web page from the web server 20 via the proxy server 30. A web browser 41 of the terminal device 40 includes an extension function execution unit 41a that executes the function of an extension program, and a debug information transmission unit 41b that transmits debug information of the extension program to the external debug support device 10.

The extension function execution unit 41a executes the function of the extension program added to an existing application. For example, the extension function execution unit 41a executes JavaScript inserted by the extension function adding unit 31 so that the extension function operates on the web page.

The debug information transmission unit 41b transmits, to the external debug support device 10, debug information of the predetermined rule for which the program was added by the debug information abstraction unit 32. For example, when the JavaScript inserted by the extension function adding unit 31 is operated by the extension function execution unit 41a, the debug information transmission unit 41b transmits, to the debug support device 10, the debug information output by the JavaScript.

The debug support device 10 receives the debug information transmitted by the debug information transmission unit 41b, and outputs the debug information. For example, the debug support device 10 outputs the debug information received from the debug information transmission unit 41b and cooperates with a debugger of an existing web browser based on the transmitted debug information. Also, the debug support device 10 has a function to edit the rule, for example. In other words, with the debug support device 10, for example, a user can generate and edit a rule with reference to debug information.

Figure 2:
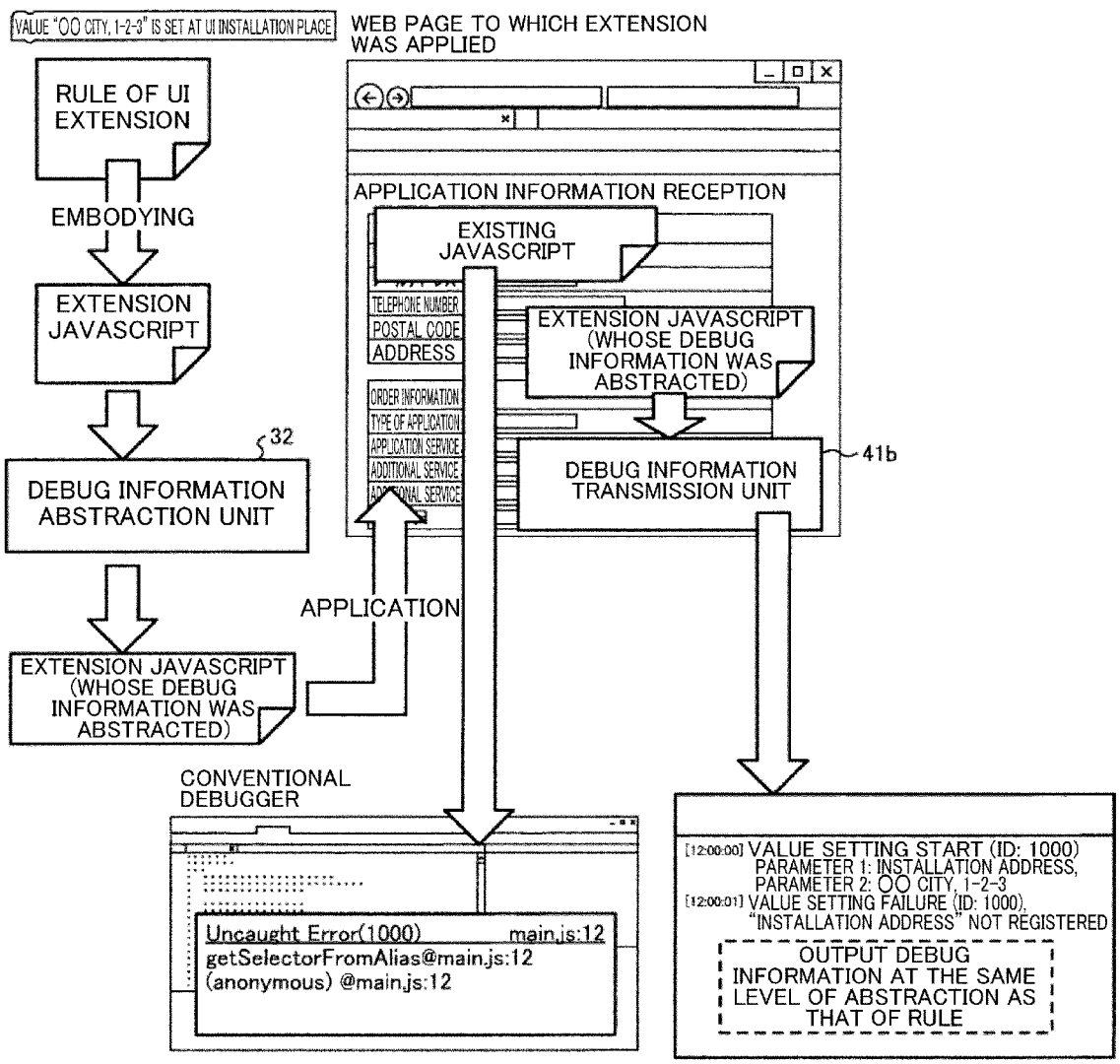
FIG. 2 is a diagram illustrating an overall flow of debug support processing performed in the debug support system according to the first embodiment.

The following will describe an overall flow of debug support processing performed in the debug support system 100 with reference to FIG. 2. FIG. 2 is a diagram illustrating an overall flow of the debug support processing performed in the debug support system according to the first embodiment. As shown in FIG. 2, the debug information abstraction unit 32 of the debug support system 100 performs abstraction processing for abstracting debug information on extension JavaScript into which a rule of a UI extension was embodied to the same granularity as that of the rule of the UI extension.

Specifically, when the rule is embodied into the program, the debug information abstraction unit 32 inserts a program for outputting debug information for each setting item. This enables obtaining debug information abstracted for each setting item when the rule is applied to an existing application. Note that the specific processes of the abstraction processing will be described in detail later with reference to FIG. 6.

Then, on the web page of the terminal device 40 to which the extension JavaScript is applied, the debug information transmission unit 41b transmits, to the debug support device 10, the debug information abstracted for each setting item when the extension rule is applied to the existing application.

Figure 3:
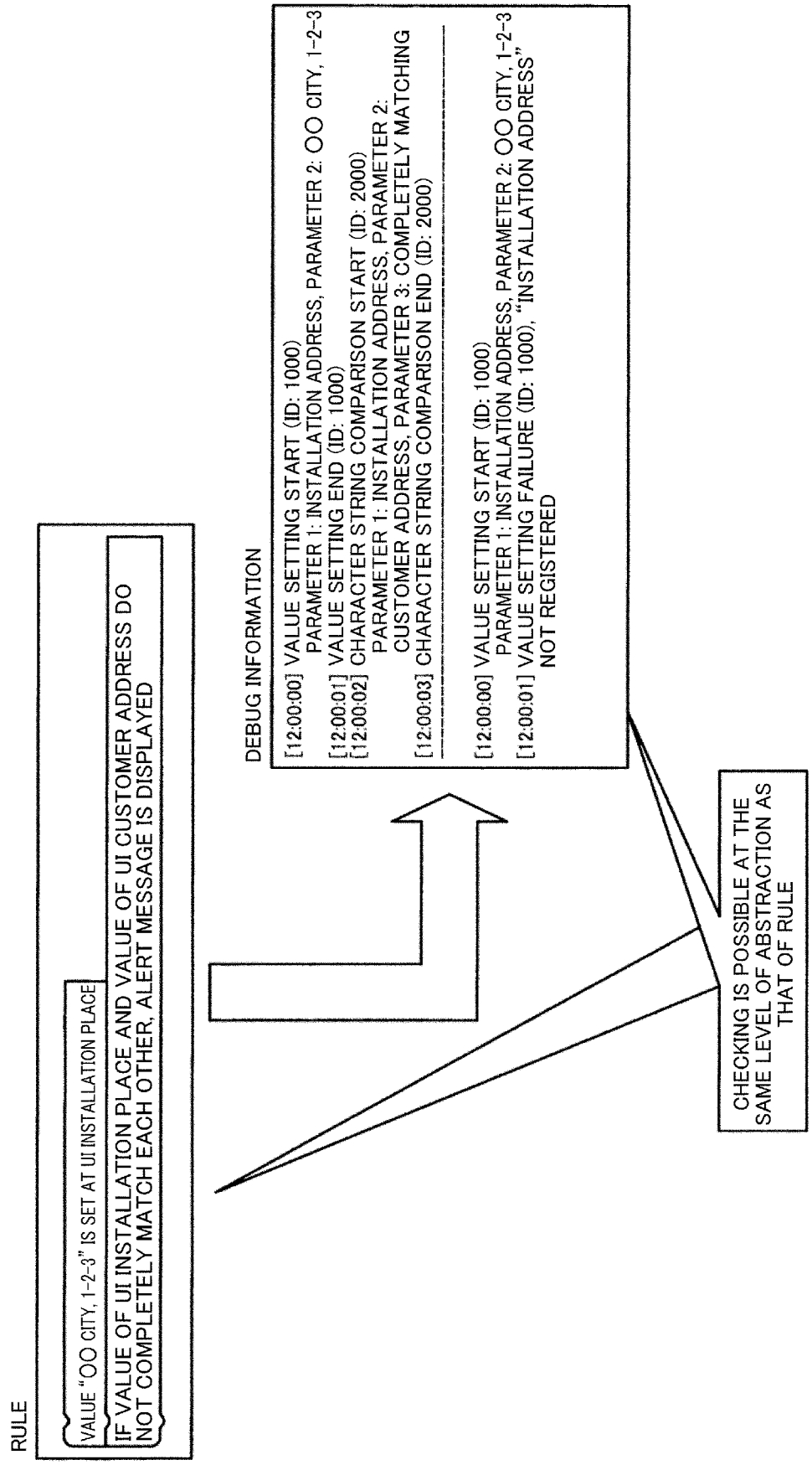
FIG. 3 is a diagram illustrating an example of output of abstracted debug information.

The following will describe an example of output of the abstract debug information with reference to an example shown in FIG. 3. FIG. 3 is a diagram illustrating an example of output of the abstract debug information. As exemplified in FIG. 3, the debug support device 10 outputs the debug information that is abstracted to the same granularity as that of the rule of the UI extension. Accordingly, a user who debugs the rule can check only the debug information on the program of the UI extension with the same level of abstraction as that of the rule.

Figure 4:
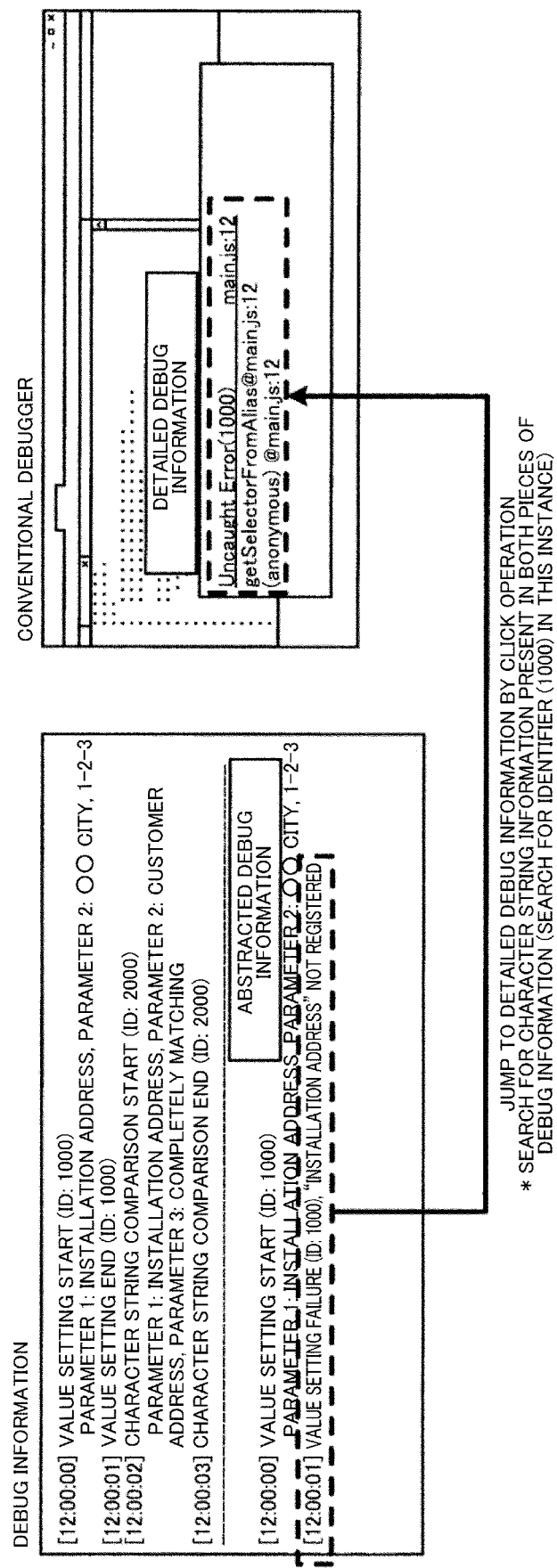
FIG. 4 is a diagram illustrating a function of associating the abstracted debug information with detailed debug information.

Also, the debug support device 10 may have a function to associate the abstracted debug information with detailed debug information. The following will describe the function of associating the abstracted debug information with detailed debug information with reference to an example shown in FIG. 4. FIG. 4 is a diagram illustrating the function of associating the abstracted debug information with detailed debug information. As exemplified in FIG. 4, when the abstracted debug information is selected by a click operation of the user, the debug support device 10 may perform a search using character string information that corresponds to the selected debug information as a search key, and may output the found detailed debug information.

Figure 5:
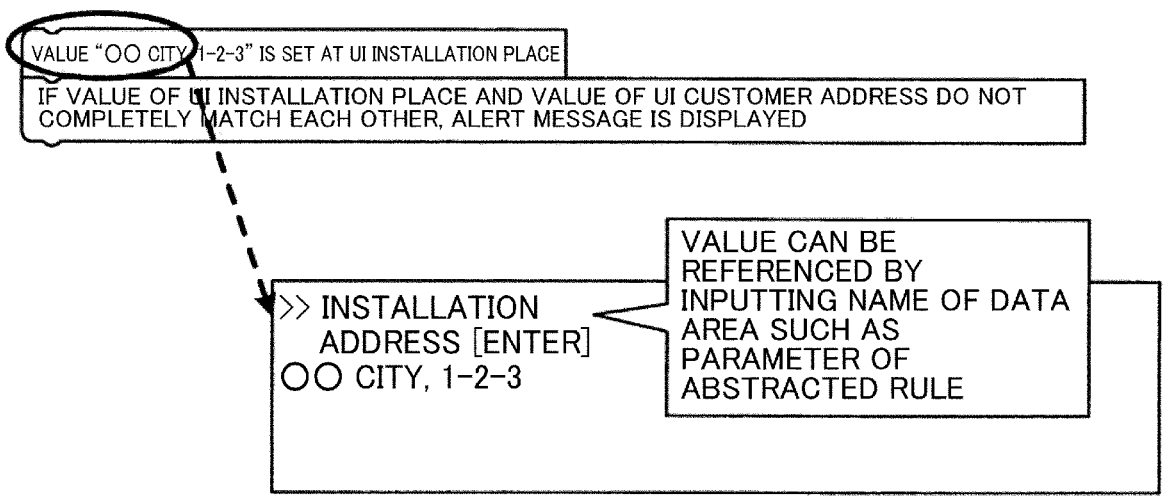
FIG. 5 is a diagram illustrating a function of watching a debug information-related parameter.

Furthermore, the debug support device 10 may also have a function to watch a data area such as parameters of the abstracted rule. The following will describe the function of watching a debug information-related parameter with reference to an example shown in FIG. 5. For example, the debug support device 10 may be configured to reference the value of a parameter of an abstracted rule upon input of the name of a data area of the parameter of the abstracted rule.

Processing Procedure of Debug Support System

Figure 6:
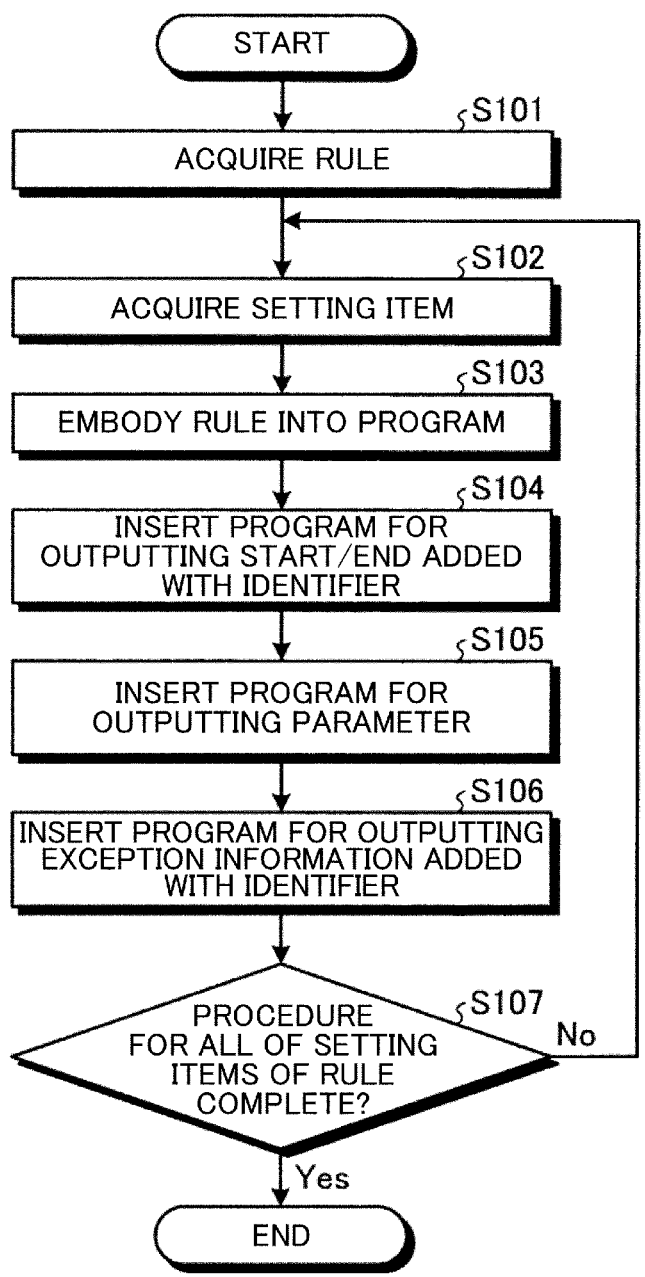
FIG. 6 is a flowchart illustrating an example of a flow of abstraction processing performed by the debug support system according to the first embodiment.

The following will describe an example of a processing procedure of the abstraction processing performed by the debug support system 100 according to the first embodiment with reference to FIG. 6. FIG. 6 is a flowchart showing an example of a flow of the abstraction processing performed by the debug support system according to the first embodiment.

As exemplified in FIG. 6, the debug information abstraction unit 32 acquires a rule of a preset UI extension (step S101), and acquires each setting item of the rule (step S102). Then, the debug information abstraction unit 32 embodies the rule of the UI extension into a program, for each setting item (step S103).

Then, the debug information abstraction unit 32 inserts a program for outputting the start/end added with an identifier identifying it (step S104), inserts a program for outputting parameters (step S105), and inserts a program for outputting exception information added with the identifier identifying it (step S106).

Then, the debug information abstraction unit 32 determines whether or not the procedure for all of the setting items of the rule is complete (step S107). Then, if it is determined that the procedure for all of the setting items of the rule is not complete (No, in step S107), the debug information abstraction unit 32 returns the procedure to step S102 and repeats the above-described processing. On the other hand, if it is determined that the procedure for all of the setting items of the rule is complete (Yes, in step S107), the debug information abstraction unit 32 ends the processing.

Figure 7:
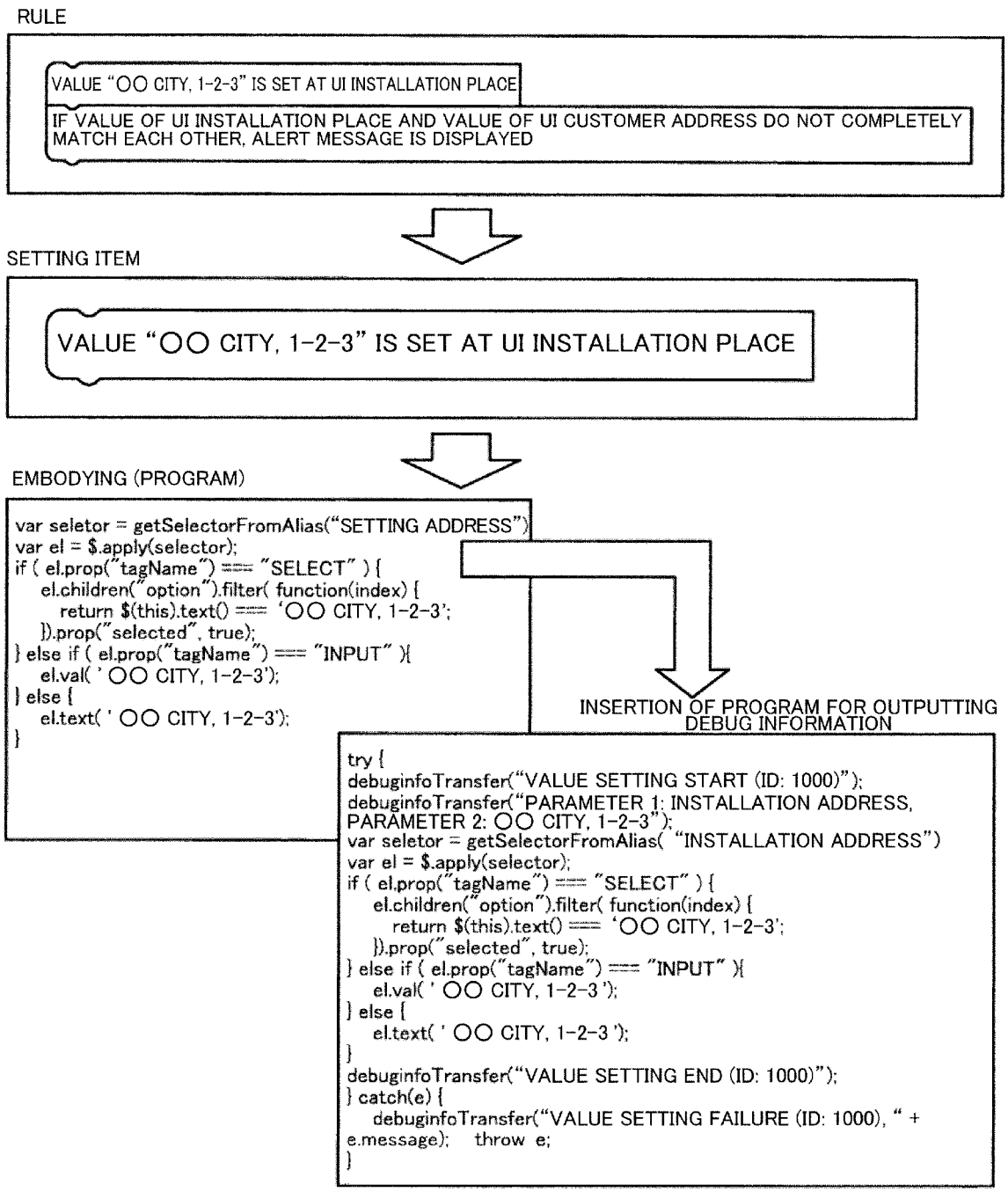
FIG. 7 is a diagram illustrating the abstraction processing performed by the debug support system according to the first embodiment.

The following will describe the abstraction processing with reference to a specific example shown in FIG. 7. FIG. 7 is a diagram illustrating the abstraction processing performed by the debug support system according to the first embodiment. As exemplified in FIG. 7, the debug information abstraction unit 32 acquires a rule and setting items thereof and embodies, for each setting item, the rule of the UI extension into a program. Then, the debug information abstraction unit 32 inserts a program for outputting the start/end added with an identifier identifying it. Here, in FIG. 7, the position that corresponds to the program for outputting the start added with the identifier is "debuginfoTransfer ("value setting start (ID: 1000)");", and the position that corresponds to the program for outputting the end added with the identifier is "debuginfoTransfer ("value setting end (ID: 1000)");".

Then, the debug information abstraction unit 32 inserts a program for outputting parameters. Here, in FIG. 7, the position that corresponds to the program for outputting parameters is "debuginfoTransfer ("parameter 1: installation address, parameter 2: ∞ city, 1-2-3");". Subsequently, the debug information abstraction unit 32 inserts a program for outputting exception information added with the identifier identifying it. Here, in FIG. 7, the positions that correspond to the program for outputting exception information added with the identifier identifying it are "try {"at the beginning and"} catch(e) {"debuginfoTransfer ("value setting failed (ID: 1000), "+e.message); throw e;}" at the end.

Effects of First Embodiment

In the debug support system 100 according to the first embodiment, when a predetermined rule of an extension program is embodied into a program, the debug information abstraction unit 32 of the proxy server 30 adds a program for outputting debug information regarding the predetermined rule to the embodied program. Also, the debug information transmission unit 41b of the terminal device 40 transmits, to the debug support device 10, debug information of the predetermined rule for which the program was added.

Accordingly, the debug support system 100 can efficiently perform debugging, and can improve the efficiency and quality of rule generation.

For example, conventional debugging need to be executed under a state in which a rule is embodied (in, for example, a programming language such as JavaScript (registered trademark)), and there is a large gap in required knowledge and information between when the rule is generated and when debugging is performed. It is often the case that a rule generator is familiar with a method for generating an abstracted rule but does not have knowledge about JavaScript, and since there is a large gap between the required knowledge between them, it is difficult for the rule generator to actually perform a debug operation. Even if the rule generator has knowledge about JavaScript, there is a large gap between information described in an abstracted rule and information output by a debugger of JavaScript, and thus it is difficult to determine which portion of the abstracted rule the information output by the debugger of JavaScript corresponds to.

Also, for example, conventional debugging cannot be performed in a manner such that a program (for example, JavaScript) that is present on an existing web page from the beginning is separate from a program (for example, JavaScript) added by UI extension are separate. In other words, a conventional debugger deals with an existing program and a program added by UI extension technique without any distinction, while regarding them as programs present on one web page, and thus information output by the debugger is such that information of the existing program and information of the program added by the UI extension are mixed, making it difficult to determine which portion is information required to correct the rule of the UI extension.

On the other hand, in the debug support system 100 according to the first embodiment, only debug information of a program of UI extension is transmitted to the outside so as to be separated from debug information of an existing program. Also, in the debug support system 100 according to the first embodiment, the debug information is abstracted from the granularity of the program to the same granularity as that of the rule of the UI extension, so that it is possible to efficiently perform debugging.

Second Embodiment

According to a second embodiment, the debug support device 10 may also generate and display a test page to debug a rule. Accordingly, the following second embodiment will describe an example in which, to debug a rule, a text of a web page to which the rule is to be applied is acquired, and a test page is generated and displayed on a web browser, and thereby the consistency of the rule is checked. Note that descriptions of the same configurations and processing as those of the first embodiment are omitted.

Figure 8:
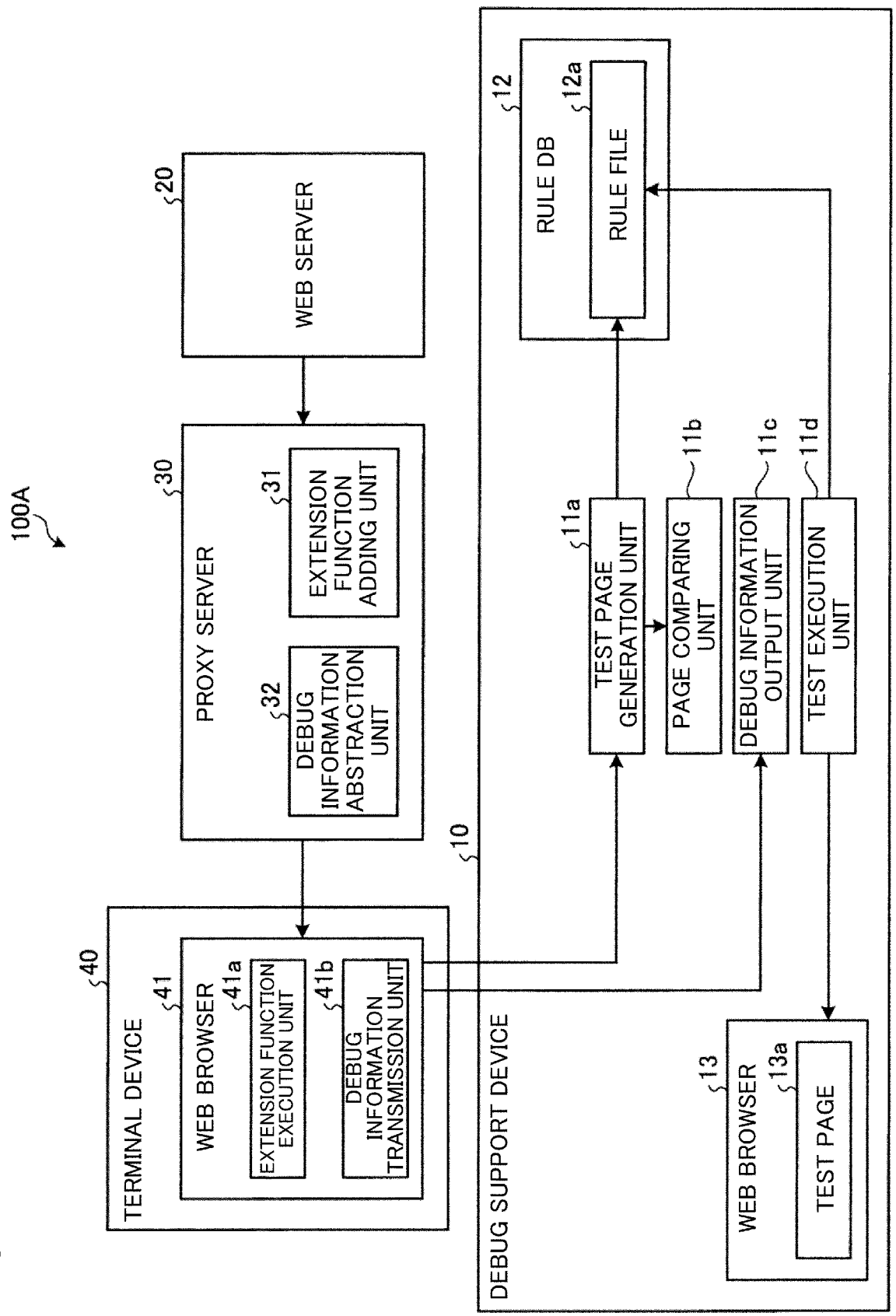
FIG. 8 is a block diagram illustrating an example of a configuration of a debug support system according to a second embodiment.

First, an example of a configuration of a debug support system 100A according to the second embodiment will be described with reference to FIG. 8. FIG. 8 is a block diagram showing an example of a configuration of the debug support system according to the second embodiment. As shown in FIG. 8, the debug support system 100A includes a debug support device 10, a web server 20, a proxy server 30, and a terminal device 40, for example.

The debug support device 10 includes a test page generation unit 11a, a page comparing unit 11b, a debug information output unit 11c, and a test execution unit 11d. The debug support device 10 also includes a rule DB (Data Base) 12 that stores a rule file 12a generated/edited by a rule editor. If an application to which a rule stored in the rule DB 12 is to be applied is specifically a web page for example, URI and selector information of the target web page are set, as an application condition of the rule, for the rule.

The test page generation unit 11a generates, if a web page is to be debugged, information regarding a simulated test page. Also, the test page generation unit 11a generates a test application obtained by simulating the web page to be debugged. For example, to debug a rule, the test page generation unit 11a acquires a text of a web page to which the rule is to be applied, checks the consistency with the rule, and stores the text information in association with the rule in the rule DB 12.

The page comparing unit 11b determines whether or not selector information on a predetermined rule of an extension program matches the text information of the test page, and displays an alert if they do not match each other. Note that it is possible to suitably change by configuring settings whether or not to execute processing that is executed by the page comparing unit 11b.

The debug information output unit 11c outputs debug information abstracted to the same granularity as that of the rule of the UI extension. Accordingly, a user who debugs the rule can check only the debug information of the program of the UI extension at the same level of abstraction as that of the rule.

The test execution unit 11d applies the predetermined rule of the extension program to information regarding the test page generated by the test page generation unit 11a. For example, to debug the rule, the test execution unit 11d reads the text information stored in association with the rule to be debugged, displays the test page obtained by simulating the target page on the web browser 13, and applies an extension function stored in the rule DB 12 thereto.

Figure 9:
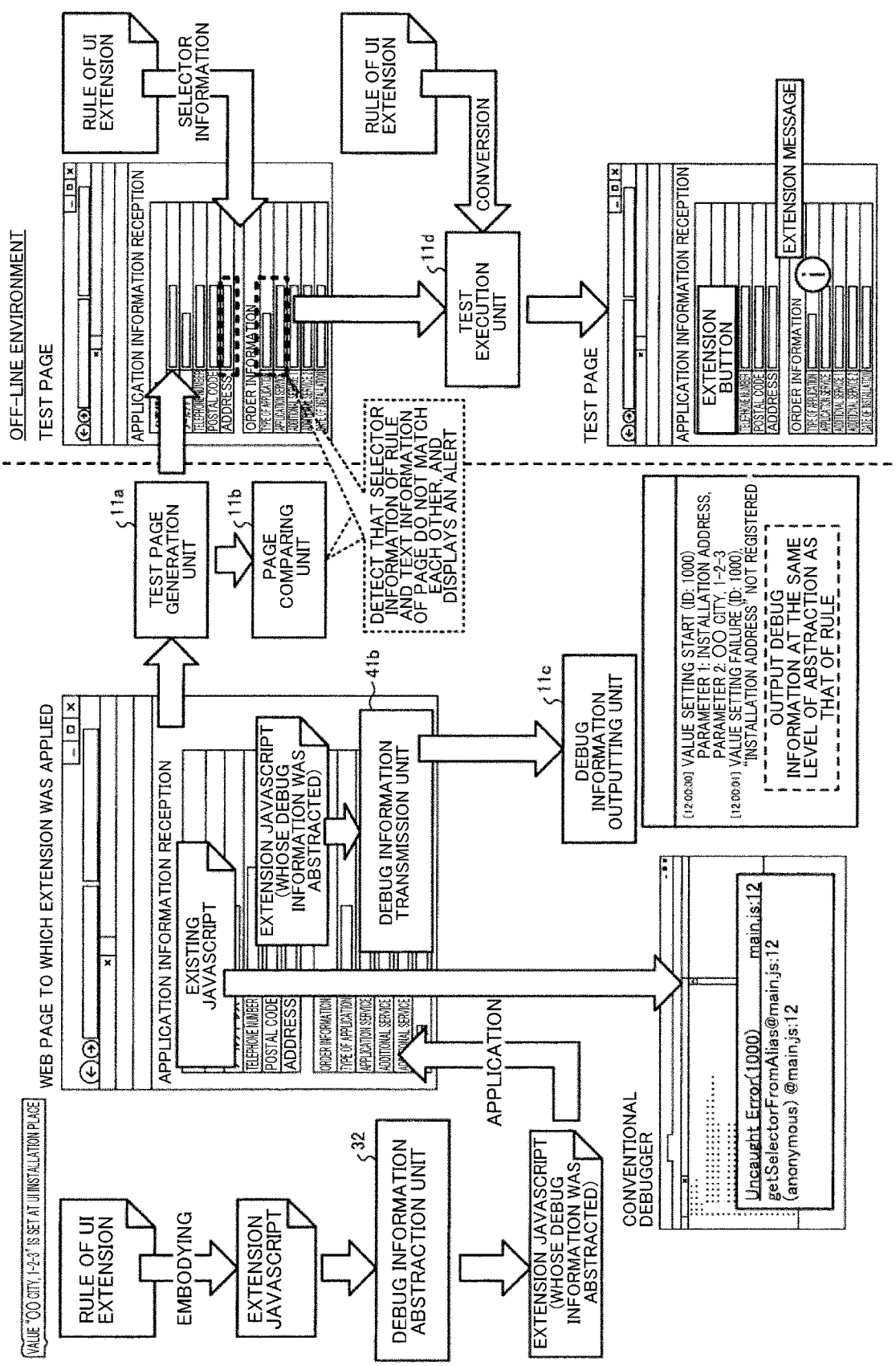
FIG. 9 is a diagram illustrating an overall flow of debug support processing performed in the debug support system according to the second embodiment.

The following will describe an overall flow of debug support processing performed in the debug support system 100A with reference to FIG. 9. FIG. 9 is a diagram illustrating an overall flow of the debug support processing performed in the debug support system according to the second embodiment. Note that description of the processing described with reference to FIG. 2 is omitted.

The test page generation unit 11a generates, for example, a test page 13a obtained by simulating a web page to be debugged in an off-line environment. Also, the page comparing unit 11b detects that selector information of the rule of UI extension and text information of the page do not match each other, and displays an alert. Note that specific processing performed by the test page generation unit 11a and the page comparing unit 11b will be described in detail later with reference to FIG. 10.

Also, the test execution unit 11d applies the rule to the test page 13a obtained by simulating the original destination to which the rule is to be applied due to a change in the rule of the UI extension, and displays the test page 13a to which the rule was applied on the web browser 13. Note that specific processing of the test execution unit 11d will be described in detail later with reference to FIG. 13.

Figure 10:
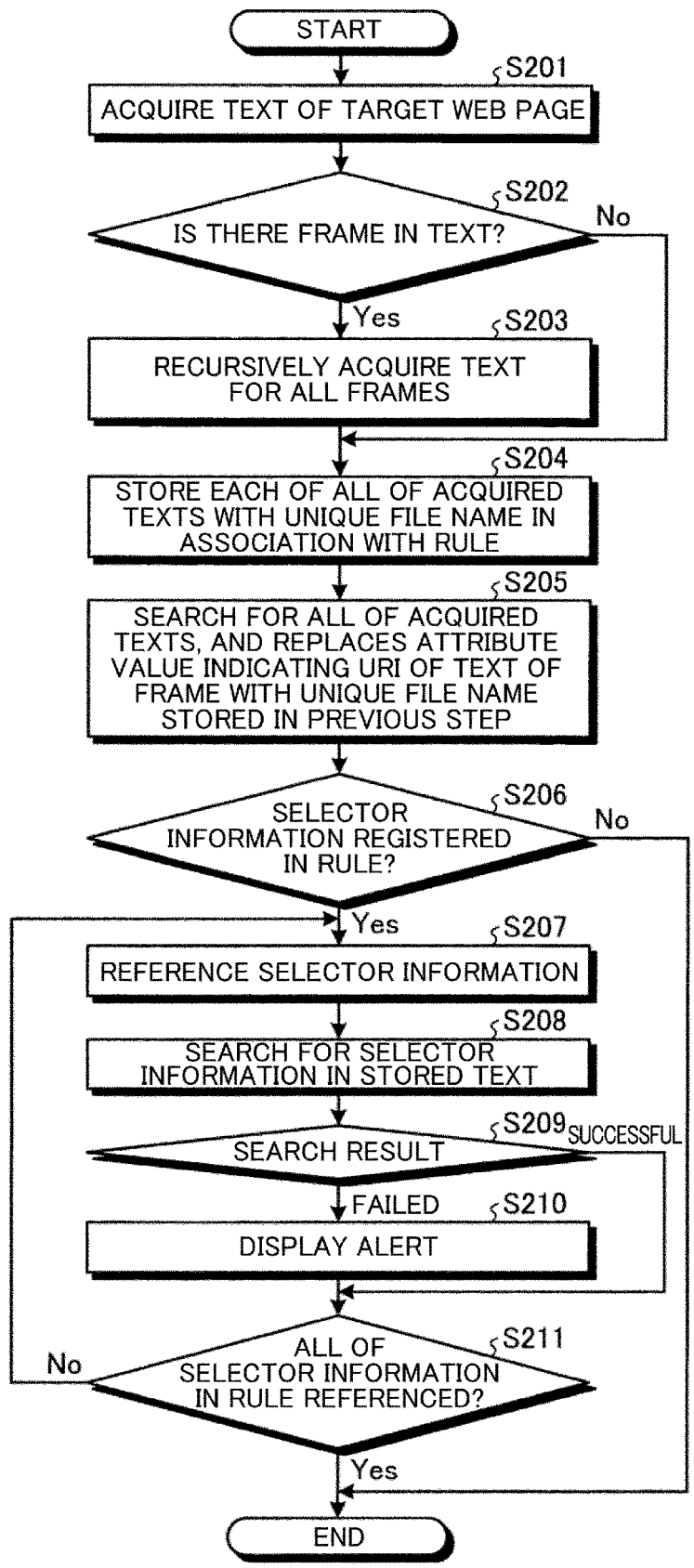
FIG. 10 is a flowchart illustrating an example of a flow of test page generation processing performed by the debug support system according to the second embodiment.

The following will describe an example of a processing procedure of test page generation processing performed by the debug support system 100A according to the second embodiment with reference to FIG. 10. FIG. 10 is a flowchart illustrating an example of a flow of the test page generation processing performed by the debug support system according to the second embodiment.

As exemplified in FIG. 10, the test page generation unit 11a acquires a text of a target web page (step S201), and determines whether or not there is a frame in the text (step S202). As a result, if it is determined that there is a frame in the text (Yes, in step S202), the test page generation unit 11a recursively acquires the text for each of all the frames (step S203), and advances the procedure to step S204. Whereas if there is no frame in the text (No, in step S202), the test page generation unit 11a directly advances the procedure to step S204.

In step S204, the test page generation unit 11a stores each of the acquired texts with a unique file name in association with the rule (step S204), searches for all of the acquired texts, and replaces the attribute value indicating the URI of the text of the frame with the unique file name stored in step S204 (step S205).

Figure 11:
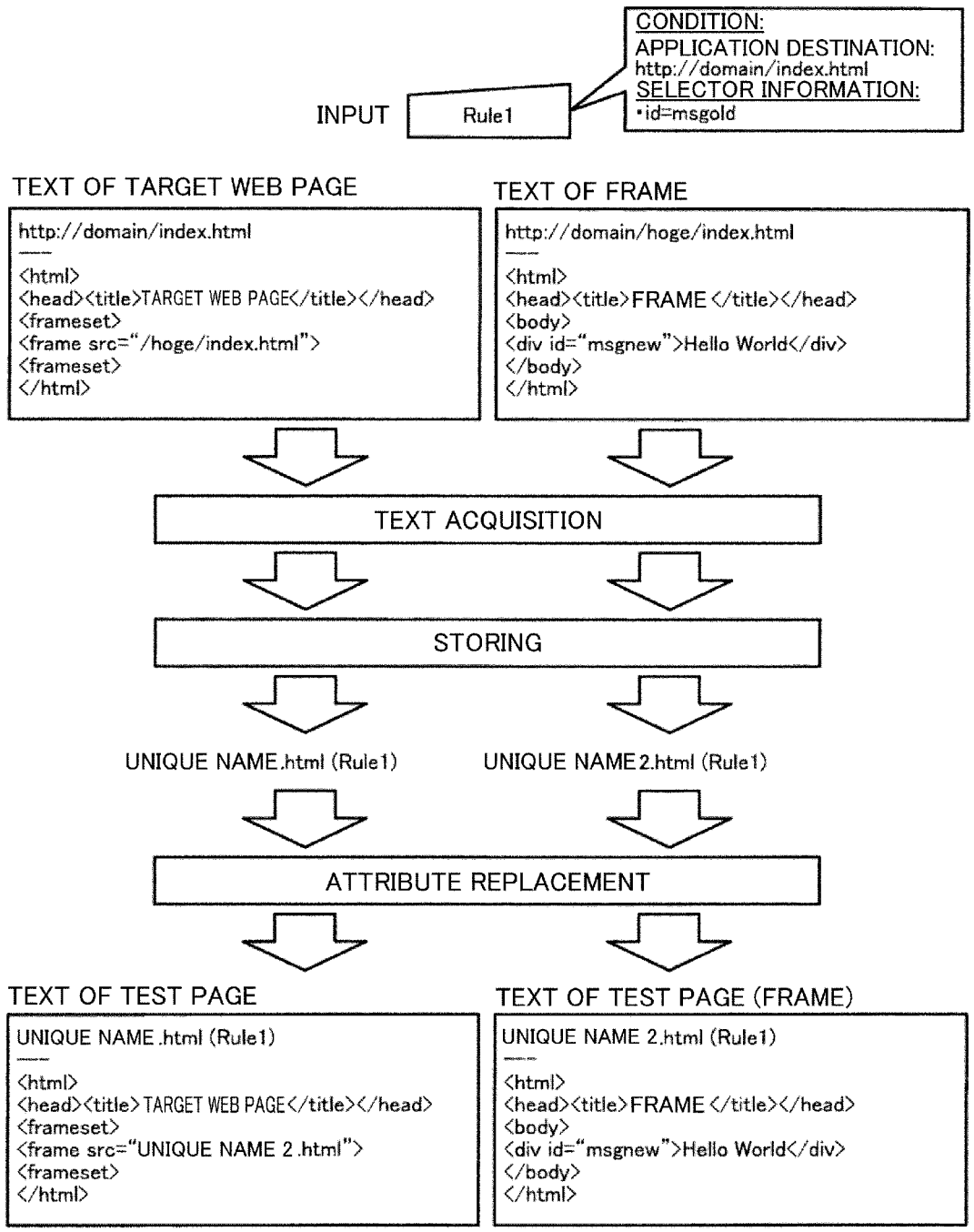
FIG. 11 is a diagram illustrating the test page generation processing performed by the debug support system according to the second embodiment.

This processing will be described with reference to a specific example shown in FIG. 11. FIG. 11 is a diagram illustrating the test page generation processing performed by the debug support system according to the second embodiment. As exemplified in FIG. 11, the test page generation unit 11a acquires a text of a target web page and acquires a text of the frame, and stores each of the texts with a unique file name in association with the rule. Then, the test page generation unit 11a replaces the attribute value "/hoge/index.html", which indicates the URI of the text of the frame with the unique file name "unique name2.html".

Returning to the description of FIG. 10, the page comparing unit 11b determines whether or not selector information is registered in the rule (step S206). As a result, if it is determined that no selector information is registered in the rule (No, in step S206), the page comparing unit 11b directly ends the processing. Whereas if it is determined that selector information is registered in the rule (Yes, in step S206), the page comparing unit 11b references the selector information in the rule (step S207), and searches for the selector information in the stored texts (step S208).

As a result, if the search for selector information is failed, the page comparing unit 11b displays an alert that correction of the rule is needed (step S210), and advances the procedure to step S211. Also, if the search for selector information is successful, the page comparing unit 11b directly advances the procedure to step S211.

Figure 12:
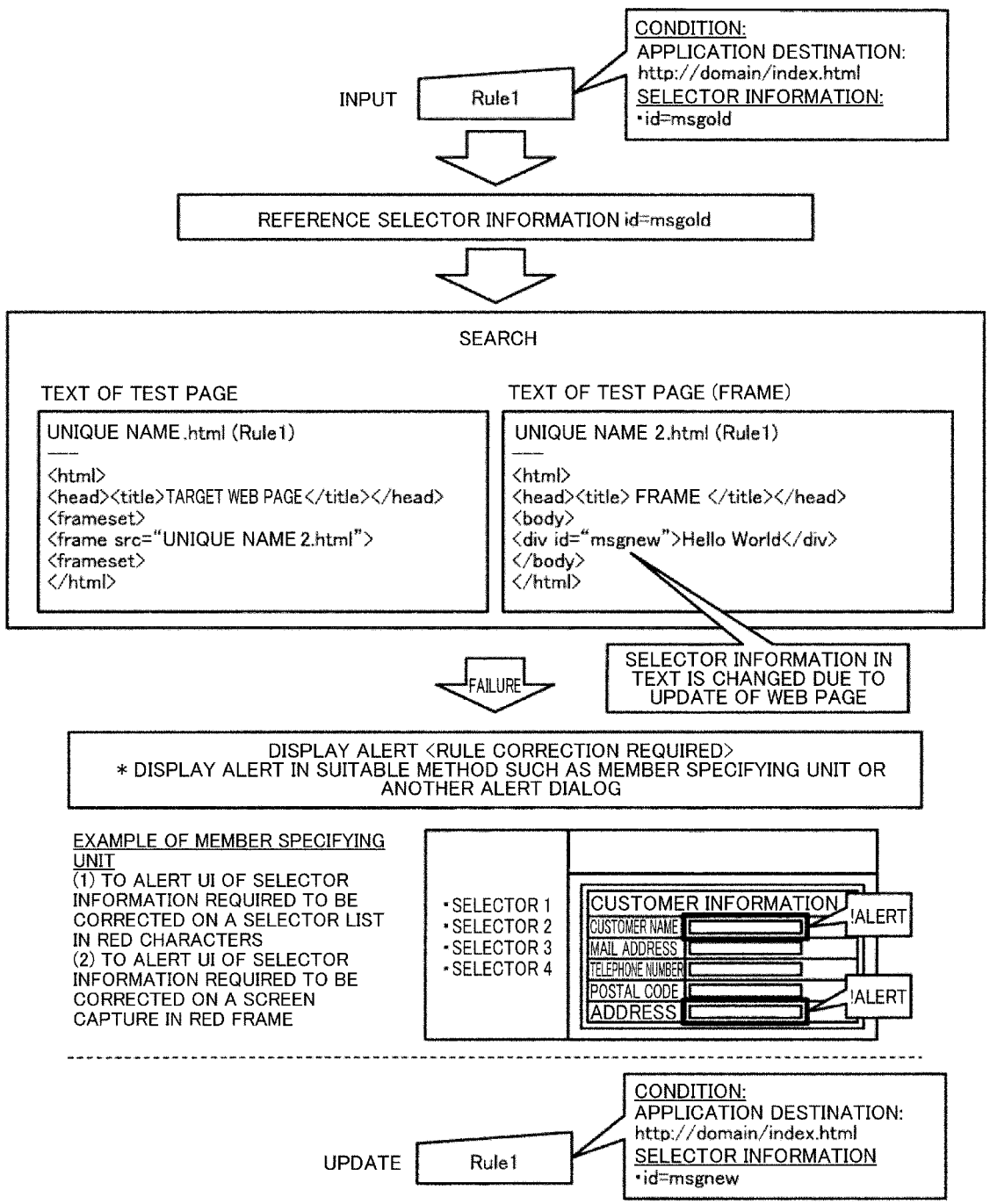
FIG. 12 is a diagram illustrating the test page generation processing performed by the debug support system according to the second embodiment.

This processing will be described with reference to a specific example shown in FIG. 12. FIG. 12 is a diagram illustrating the test page generation processing performed by the debug support system according to the second embodiment. In the example of FIG. 12, it is assumed that, as conditions of an input rule "Rule1", "http://domain/index.html" is set as a destination URI to which the rule is to be applied, and "id=msgold" is set as selector information.

Then, as exemplified in FIG. 12, the page comparing unit 11b refers to the selector information "id=msgold" in the rule, and searches for the selector information "id=msgold" in the stored texts. In the example of FIG. 12, the selector information in the text has been changed due to update of the web page. As a result, the page comparing unit 11b fails to search for the selector information, and displays an alert that the rule needs to be corrected. Here, any method may be used as the method for displaying the alert, and for example, the test page generation unit 11a may give an alert such that the UI of the selector information to be corrected is in red characters on a selector list, or may give an alert such that the UI of the selector information to be corrected is in a red frame on a screen capture. Also, in the example of FIG. 12, a user recognizes the alert and manually updates the selector information of the Rule1 to "id=msgnew". Note that the selector information may also be automatically updated to "id=msgnew".

Returning to the illustration of FIG. 10, in step S211, the page comparing unit 11b determines whether or not all of the selector information in the rule have been referenced (step S211). As a result, if all of the selector information in the rule have not been referenced (No, in step S211), the page comparing unit 11b returns the procedure to step S207 and repeats the above-described processing. Also, if all of the selector information in the rule have been referenced (Yes, in step S211), the page comparing unit 11b ends the processing.

Note that the page comparing unit 11b can also function alone. Accordingly, when information such as URL or ID that is stored in the rule is changed by a person who make setting, the page comparing unit 11b can be used in tests for checking whether or not the rule operates correctly, such as a regression test when the rule is changed and a test for checking cooperation between a plurality of rules.

Figure 13:
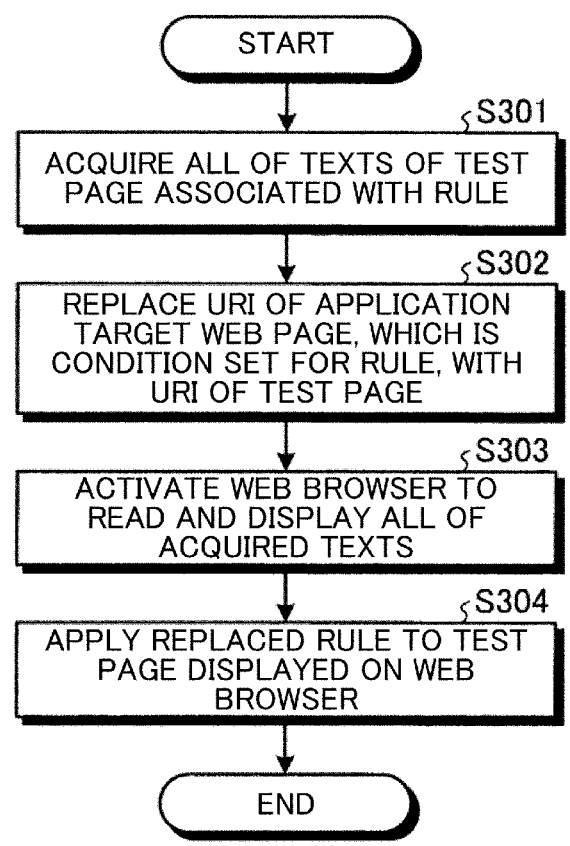
FIG. 13 is a flowchart illustrating an example of a flow of test execution processing performed by the debug support system according to the second embodiment.

The following will describe an example of a processing procedure of test execution processing performed by the debug support system 100A according to the second embodiment with reference to FIG. 13. FIG. 13 is a flowchart showing an example of a flow of the test execution processing performed by the debug support system according to the second embodiment.

As exemplified in FIG. 13, the test execution unit 11d acquires all of the texts of the test page associated with the rule (step S301), and replaces the URI of the application target web page, which is a condition set for the rule, with the URI of the test page (step S302).

Then, the test execution unit 11d activates the web browser 13 to read and display all of the acquired texts (step S303), and applies the replaced rule to the test page 13a displayed on the web browser 13 (step S304).

Figure 14:
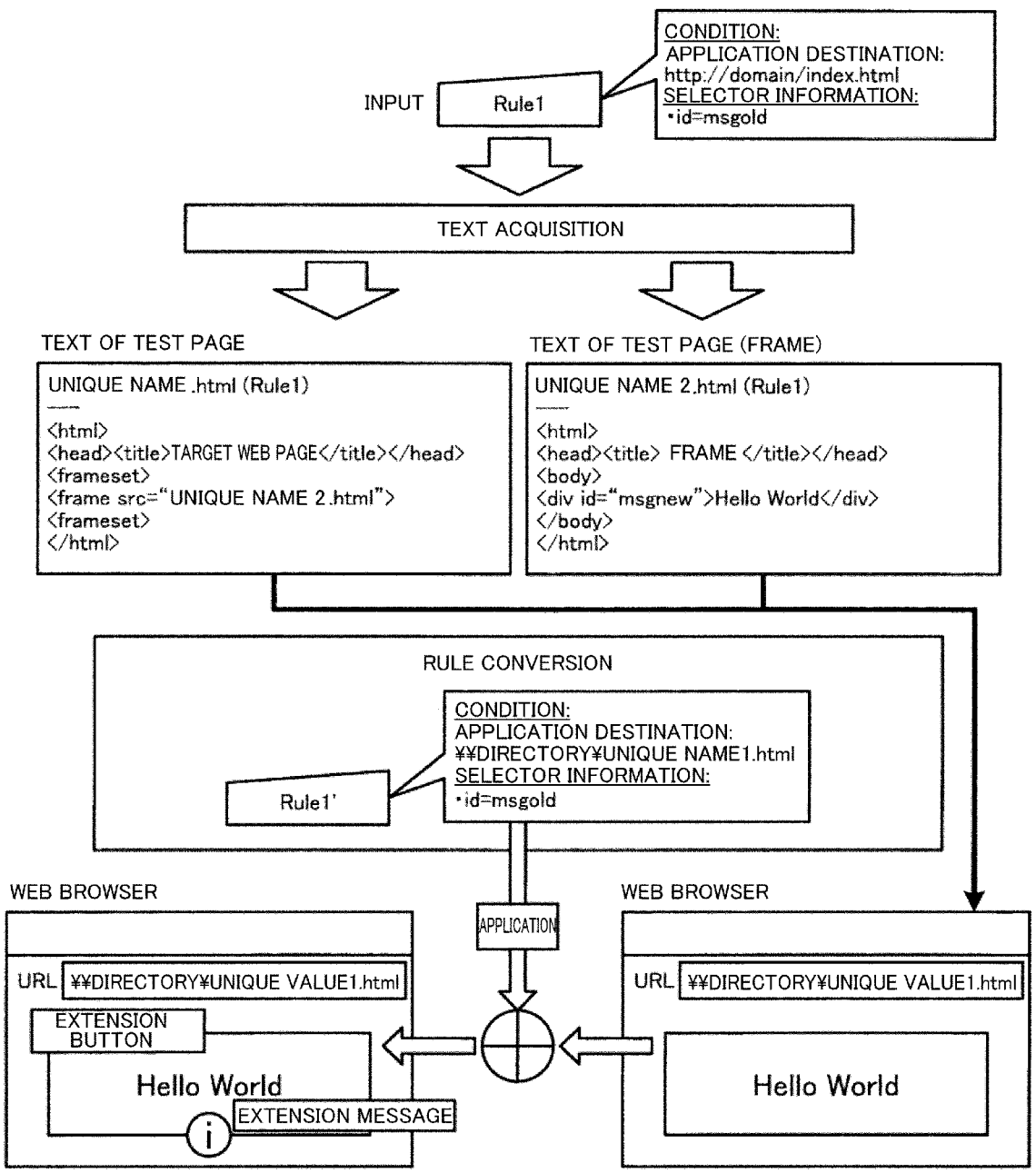
FIG. 14 is a diagram illustrating the test execution processing performed by the debug support system according to the second embodiment.

This processing will be described with reference to a specific example shown in FIG. 14. FIG. 14 is a diagram illustrating the test execution processing performed by the debug support system according to the second embodiment. In the example of FIG. 14, it is assumed that, as conditions of the input rule "Rule1", "http://domain/index.html" is set as a destination URI to which the rule is to be applied, and "id=msgold" is set as selector information.

As exemplified in FIG. 14, the test execution unit 11d acquires all of the texts of the test page associated with the rule, and replaces the URI of the application target web page http://domain/index.html, which is a condition set for the rule, with "¥¥directory¥unique name1.html" of the URI of the test page, and defines it as "Rule1'". Then, the test execution unit 11d activates the web browser 13 to read and display all of the acquired texts, and applies the replaced rule to the test page 13a displayed on the web browser 13.

Effects of Second Embodiment

Accordingly, the debug support system 100A according to the second embodiment can perform debugging in the off-line environment. For example, a case is conceivable in which a conventional rule generator generates a rule in an environment in which he or she cannot access, via a network, an existing web page to which UI extension is to be applied, and it is difficult to use a conventional debugger in such an environment. In other words, in the conventional debugger, it is assumed that a web page-developer debugs the corresponding page, and thus it is implicitly premised on an environment where the web page-developer can access the page at the time of debugging. Accordingly, the conventional debugger cannot be used as is in an environment such as an off-line environment where the corresponding page cannot be accessed and information on the page cannot be acquired. Also, in the rule generator environment, use restriction may also be added to the mode of a developer such as a debugger.

Also, in the conventional UI extension, not a web page developer but a user adds an extension to the corresponding page, and thus a case is conceivable in which a rule is generated in an environment in which information on this page cannot be acquired. In such a case, to use a conventional debugger, it is necessary to create an environment so that information on the web page can be acquired from the web page developer and can be used offline.

In contrast, the debug support system 100A according to the second embodiment can perform debugging in the off-line environment. In other words, in the debug support system 100A, text attribute replacement is performed to enable page information, specifically, information (frame construction and text of each frame) required to debug the UI extension to be acquired and used offline, and rule conversion is performed to make the rule applicable to a test page. Accordingly, it is possible to perform debugging in the off-line environment, by applying a rule to a simulated test page in the off-line environment and displaying the test page to which the rule was applied on the web browser.

Also, there is a case where the web page to which a rule is applied is updated frequently. In such a case, the rule needs to be corrected, but in such a case, it is necessary to check which part of the web page has been changed and to determine whether or not the changed part affects the rule (whether or not the rule must be changed). It is inefficient to execute such operations on the web page that is frequently updated. However, in the debug support system 100A according to the second embodiment, a position at which the rule needs to be corrected can be displayed with an alert by the page comparing unit 11b, or can be automatically corrected. Therefore, it is possible to effectively perform rule correction and debugging operations due to the update of the web page.

System Configuration and the Like

Furthermore, the constituent components of the shown devices are based on the functional concept and are not necessarily required to have a physical configuration as shown in the drawings. That is to say, the specific aspects of distribution and combination of the devices are not limited to those shown in the drawings, and a configuration is also possible in which some or all thereof can be distributed/combined functionally or physically in arbitrary units according to various types of loads or status of use. Moreover, all or given number of processing functions that are executed in each device may be realized by a CPU or a program to be analyzed and executed by the CPU, or may be realized by hardware using a wired logic.

Also, of the processing described in the present embodiments, all or some pieces of processing that have been described as being automatically executed can be executed manually, or all or some pieces of processing that have been described as being manually executed can be executed automatically in a well-known method. Furthermore, information described in the text and shown in the drawings, including the processing procedures, the control procedure, the specific names, and various types of data and parameters can be changed suitably unless otherwise noted.

Program

Also, it is also possible to create a program in which the processing executed by the debug support device according to the foregoing embodiments is described in a computer-executable language. For example, it is also possible to create a debug support program in which the processing executed by the debug support device 10 according to the embodiments is described in a computer-executable language. In this case, by a computer executing the debug support program, the same effects as those obtained in the foregoing embodiments can be obtained. Furthermore, by recording this debug support program in a computer-readable recording medium and causing the computer to read and execute the debug support program recorded in this recording medium, the same processing as that described in the foregoing embodiments may also be realized.

Figure 15:
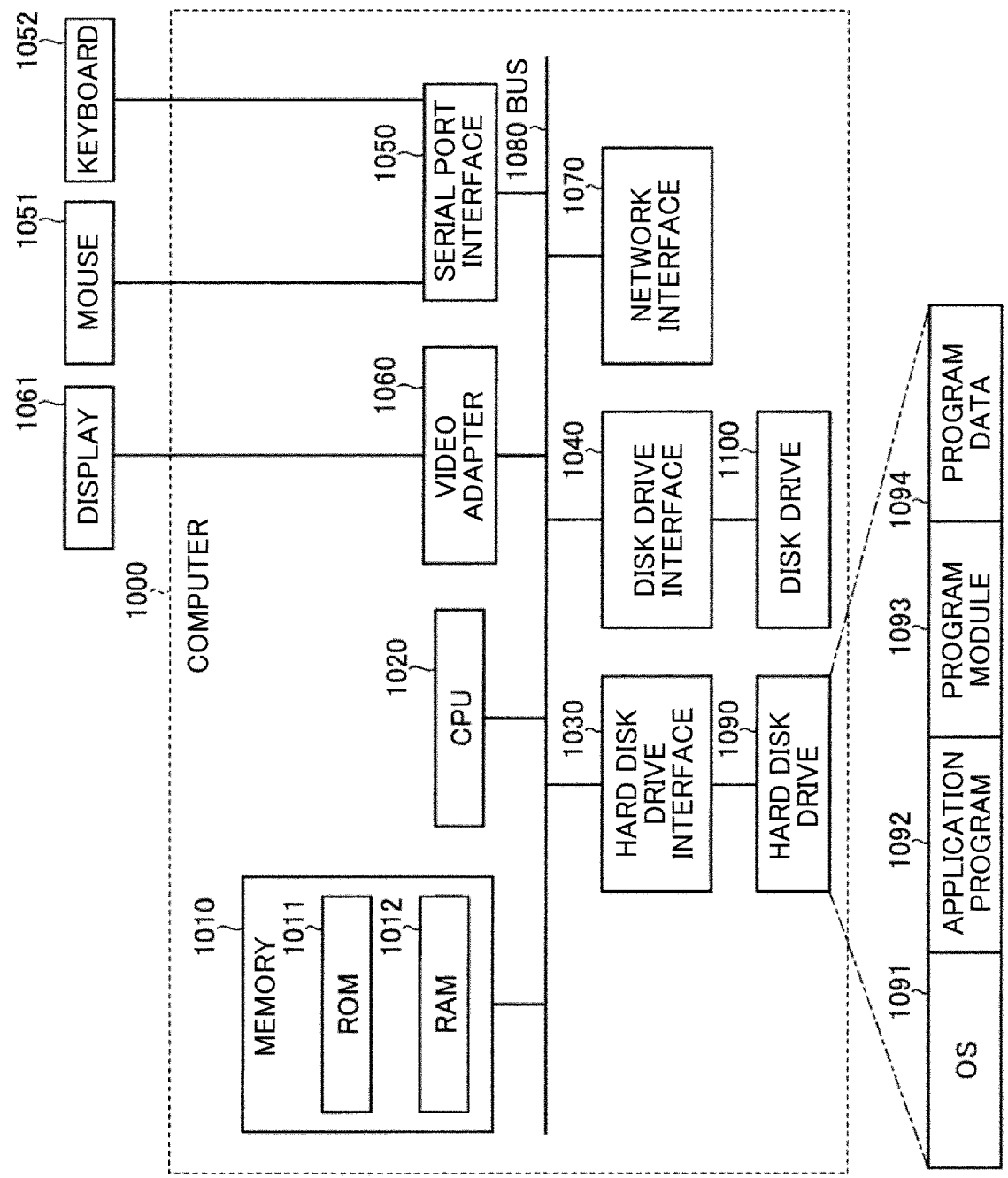
FIG. 15 is a diagram illustrating a computer that executes a debug support program.

FIG. 15 is a diagram illustrating a computer that executes the debug support program. As exemplified in FIG. 15, a computer 1000 includes, for example, a memory 1010, a CPU 1020, a hard-disk drive interface 1030, a disk drive interface 1040, a serial port interface 1050, a video adaptor 1060, and a network interface 1070, and these units are connected to each other via a bus 1080.

As exemplified in FIG. 15, the memory 1010 includes a ROM (Read Only Memory) 1011 and a RAM 1012. The ROM 1011 stores, for example, a boot program such as a BIOS (Basic Input Output System). As exemplified in FIG. 15, the hard-disk drive interface 1030 is connected to a hard disk drive 1090. As exemplified in FIG. 15, the disk drive interface 1040 is connected to a disk drive 1100. For example, a detachable storage medium such as a magnetic disk or an optical disk is inserted into the disk drive 1100. As exemplified in FIG. 15, the serial port interface 1050 is connected to a mouse 1110 and a keyboard 1120, for example. As exemplified in FIG. 15, the video adaptor 1060 is connected to a display 1130, for example.

Here, as exemplified in FIG. 15, the hard disk drive 1090 stores an OS 1091, an application program 1092, a program module 1093, and program data 1094, for example. That is to say, the above-described debug support program is stored in the hard disk drive 1090, as a program module in which commands to be executed by the computer 1000 are described, for example.

Also, various types of data described in the foregoing embodiments may be stored, as program data, in the memory 1010 or the hard disk drive 1090, for example. Also, the CPU 1020 reads the program module 1093 or program data 1094 stored in the memory 1010 and the hard disk drive 1090 onto the RAM 1012 as needed, and executes various types of processing procedures.

Note that the program module 1093 and the program data 1094 according to the debug support program are not limited to being stored in the hard disk drive 1090, and may also be stored in e.g., a detachable storage medium and read by the CPU 1020 via the disc drive or the like. Alternatively, the program module 1093 and the program data 1094 according to the debug support program may also be stored in another computer connected thereto via a network such as a LAN (Local Area Network) or a WAN (Wide Area Network), and may be read by the CPU 1020 via the network interface 1070.

REFERENCE SIGNS LIST

10 Debug support device
11a Test page generation unit
11b Page comparing unit
11c Debug information output unit
11d Test execution unit
12 Rule DB 12a Rule file
13 Web browser
13a Test page
20 Web server
30 Proxy server
31 Extension function adding unit
32 Debug information abstraction unit
40 Terminal device
41 Web browser
41a Extension function execution unit
41b Debug information transmission unit
100 Debug support system

The invention claimed is:

1. A debug support system for debugging a webpage extension program being used in a web page, comprising:
an abstraction unit, including one or more processors, configured to, when a predetermined rule of the webpage extension program is inserted into a webpage program of the web page, generate a first script for outputting debug information regarding the predetermined rule and add the first script to a second script of the webpage program;
a transmission unit, including one or more processors, configured to transmit, to an external device, the debug information regarding the predetermined rule; and
a test page generation unit, including one or more processors, configured to:
obtain (i) a first text of the web page and (ii) a respective second text of each respective frame in one or more frames of the web page;
for each of the first text and the second texts, store the respective text in a respective file that has a respective unique file name;
search the first text and the second texts for attribute values indicating Uniform Resource Identifiers (URIs) and update at least one of the first text and the second texts by replacing each of the URIs in the first text and second texts with one of the unique file names; and
after updating at least one of the first text and the second texts, generate text for a test page using the first text and second texts; and
a test execution unit, including one or more processors, configured to apply the predetermined rule of the webpage extension program to the test page,
wherein when a setting item of the predetermined rule of the webpage extension program is embodied into the webpage program, the abstraction unit is configured to generate the first script for outputting, as the debug information, at least information indicating the start and end of reflection of the setting item, information regarding a parameter input for the setting item, exception information indicating a case where reflection of the setting item is failed, and an identifier that uniquely specifies the setting item.

2. The debug support system according to claim 1, further comprising
a page comparing unit, including one or more processors, configured to:
search selector information of the predetermined rule of the webpage extension program in the text of the test page; and
in response to not finding the selector information in the text of the test page, display an alert.

3. The debug support system of claim 1, wherein applying the predetermined rule of the webpage extension program to the test page comprises;
generating a replaced rule from the predetermined rule by replacing a URI of the web page in a condition included in the predetermined rule with the URI of the test page;
activating a web browser to display the test page; and
applying the replaced rule to the test page displayed on the web browser.

4. A debug support method for debugging a webpage extension program being used in a web page, the debug support method comprising:
when a predetermined rule of the webpage extension program is inserted into a webpage program of the web page, generating a first script for outputting debug information regarding the predetermined rule and adding the first script to a second script of the webpage program;
transmitting, to an external device, the debug information regarding the predetermined rule;
obtaining (i) a first text of the web page and (ii) a respective second text of each respective frame in one or more frames of the web page;
for each of the first text and the second texts, storing the respective text in a respective file that has a respective unique file name;
searching the first text and the second texts for attribute values indicating Uniform Resource Identifiers (URIs) and updating at least one of the first text and the second texts by replacing each of the URIs in the first text and second texts with one of the unique file names; and
after updating at least one of the first text and the second texts, generating text for a test page using the first text and second texts; and
applying the predetermined rule of the webpage extension program to the test page,
wherein
when a setting item of the predetermined rule of the webpage extension program is embodied into the webpage program, generating the first script for outputting, as the debug information, at least information indicating the start and end of reflection of the setting item, information regarding a parameter input for the setting item, exception information indicating a case where reflection of the setting item is failed, and an identifier that uniquely specifies the setting item.

5. The debug support method according to claim 4, further comprising:
searching selector information of the predetermined rule of the webpage extension program in the text of the test page; and
in response to not finding the selector information in the text of the test page, displaying an alert.

* * * * *